(12) United States Patent
Hyppönen

(10) Patent No.: US 8,127,141 B2
(45) Date of Patent: Feb. 28, 2012

(54) METHOD AND APPARATUS FOR SELECTING A PASSWORD

(75) Inventor: Ari Hyppönen, Degerby (FI)

(73) Assignee: F-Secure Oyj, Helsinki (FI)

( * ) Notice: Subject to any disclaimer, the term of this patent is extended or adjusted under 35 U.S.C. 154(b) by 1325 days.

(21) Appl. No.: 10/493,596

(22) PCT Filed: Oct. 29, 2002

(86) PCT No.: PCT/EP02/12183
§ 371 (c)(1), (2), (4) Date: Oct. 19, 2004

(87) PCT Pub. No.: WO03/038569
PCT Pub. Date: May 8, 2003

(65) Prior Publication Data
US 2005/0044425 A1   Feb. 24, 2005

(30) Foreign Application Priority Data
Oct. 30, 2001   (GB) .................................. 0125980.3

(51) Int. Cl.
*G06F 21/00* (2006.01)
(52) U.S. Cl. .......................................... 713/184; 726/28
(58) Field of Classification Search .................. None
See application file for complete search history.

(56) References Cited

U.S. PATENT DOCUMENTS

| | | | |
|---|---|---|---|
| 5,465,084 A | 11/1995 | Cottrell | |
| 5,588,056 A | 12/1996 | Ganesan | |
| 5,699,514 A | 12/1997 | Durinovic-Johri et al. | |
| 5,928,364 A * | 7/1999 | Yamamoto | 726/18 |
| 5,991,882 A | 11/1999 | O'Connell | |
| 6,212,638 B1 | 4/2001 | Lee et al. | |
| 6,253,248 B1 * | 6/2001 | Nakai et al. | 709/237 |
| 6,574,377 B1 * | 6/2003 | Cahill et al. | 382/305 |
| 7,219,368 B2 * | 5/2007 | Juels et al. | 726/2 |
| 2001/0009583 A1 | 7/2001 | Murakami | |

FOREIGN PATENT DOCUMENTS

| | | |
|---|---|---|
| EP | 0 947 908 A2 | 10/1999 |
| EP | 1 313 027 A1 | 5/2003 |
| JP | 224775 | 1/1990 |
| JP | 2001211157 | 8/2001 |
| JP | 2001282377 | 10/2001 |
| JP | 2001282738 | 10/2001 |

OTHER PUBLICATIONS

PCT International Publication No. WO 92/04671, Publication Date: Mar. 19, 1992
S.A. Kurzban, et al., "Easily Remembered Passphrases," IBM Technical Disclosure Bulletin, vol. 27, No. 8, Jan. 1985.
M. Zviran & W.J. Haga, "Next Decade in Information Technology," Proc. 5$^{th}$ Jewish Conference on Information Technology, 1990, pp. 137-144, "User authentication by cognitive passwords: an empirical assessment".
"Passlogix v-GGO 2.0 Offers Effortless Navigation From Registration to Logon," http://www.tech.com/techdocs/TS991008-2.html, Jun. 10, 1999, see also http://www.passlogix.com.

* cited by examiner

*Primary Examiner* — Nasser Moazzami
*Assistant Examiner* — Carlton V Johnson
(74) *Attorney, Agent, or Firm* — Arent Fox LLP

(57) ABSTRACT

A method of generating or entering a password or passphrase on a computer system 1. The method comprises storing a plurality of sets of values in a memory 5 of the system 1, the values of each set defining respective elements which belong to a common domain, the domains of respective sets being distinct from one another, selecting at least one value from each stored set or from each of a plurality of the stored sets, and combining the selected values or elements thereof to form a password or passphrase.

8 Claims, 4 Drawing Sheets

METHOD AND APPARATUS FOR SELECTING A PASSWORD

CROSS-REFERENCE TO RELATED APPLICATION

This application is a National Stage entry of International Application No. PCT/EP0212183, filed Oct. 29, 2002, the entire specification claims and drawings of which are incorporated herewith by reference.

FIELD OF THE INVENTION

The present invention relates to a method and apparatus for selecting a password and is applicable in particular, though not necessarily, to mobile devices which lack a physical keyboard, such as one-hand controlled smart phones and stylus driven PDAs.

BACKGROUND OF THE INVENTION

Many Smart Phone and Personal Digital Assistant (PDA) users need to store valuable confidential information on their systems. User authentication alone is not enough to keep this information safe as an attacker can capture and probe the device offline to retrieve the information, bypassing any authentication system. The only way to protect the stored information is to encrypt it with a cryptographic key. The easiest way to create the key is to generate it from data collected during authentication. The best recognised such methods use cryptographic hash functions and message authentication code algorithms to derive the key indirectly from a passphrase, typically chosen by the user and entered into the device.

The value of a passphrase as a source for a symmetric cipher key can be measured as the amount of entropy that the passphrase contains. For example, regular English words constructed using the Latin alphabet have an entropy of approximately 1 bit per letter, whilst a totally random string of lowercase letters and numbers has an entropy of approximately 5 bits per letter. The following table shows that a proper password should be quite long in order to provide adequate protection against a brute force attack, i.e. an exhaustive search of all possible key values.

| Symmetric key length | Time required to break |
| --- | --- |
| 56 bits | 5 minutes |
| 80 bits | 50 years |
| 96 bits | 3 million years |
| 128 bits | $10^{16}$ years |

The times shown in the table correspond with computing performance of equipment worth of $10 million USD. In the light of ever increasing computing power and new processing techniques, a key of around 75 to 90 bits would appear to provide an adequate level of security.

Typically, a passphrase is a sequence of letters, digits and other characters, which the user memorises. These conventional alphanumeric passphrases have several disadvantages. Easy to remember passphrases can be compromised through so called dictionary and brute force attacks, while randomly generated long passphrases that provide high security are difficult for the user to remember. These disadvantages become even more important in smart phone and PDA environments where constraints (e.g. the lack of a traditional keyboard) make textual passphrase entry slow and cumbersome.

There are several ease-of-use requirements for passphrase systems on smart phones and PDAs that have no keyboard, but which rely on a joystick, roller, pen or a special stylus as the input device:
  The password should be quick to enter, which implies that it should be short and require no hard-to-reproduce pen movements or too many taps and strokes.
  The password should be easy to remember and recall instantly, which implies that it should be something meaningful rather than random data.
  It should not be required to change the password frequently, so as to minimize the "load" on the user's memory and to avoid extra administrative work resulting from forgotten passwords.
  The limited input facilities of mobile devices often result in text entry errors. The device should give the user visual feedback during the password entry so that the user will notice immediately any errors.

There are however many security requirements relating to the password which contradict the ease-of-use requirements:
  To guard against so-called dictionary attacks (exhaustive searches through all words found in dictionaries and other sources), the password should not be a real word or a simple derivation of a real word in any language. Preferably, it should be totally random.
  To provide adequate protection against so-called brute force attacks (exhaustive searches of all possible character combinations), the password should be long and consist of characters from a large alphabet, e.g. a textual password should include a mixture lower case and upper case letters, digits, punctuation, and other special characters.
  To protect against so-called educated guess attacks (manual or semi-automatic searches of different passwords the attacker chooses based on information about the user's personality, habits, family, possessions, etc.), the password should be generated randomly by the system rather than chosen freely by the user.
  The password should not be written down. Preferably, the password format should make it easy for the user to memorize the password mentally, avoiding the need to write it down on a piece of paper.
  Corporate users will often take their mobile devices with them when they're away from the office, so the devices are more likely to get lost or stolen than desktop PCs. The attacker can probe the device or simply observe the user during password entry to discover the password. For this reason, the mobile device password should not be used on other systems. Preferably, the mobile device password format should make it difficult to choose the same password to access corporate network and other resources.
  The user should be able to enter the password in secrecy so that it is not revealed to onlookers.

These contradictory requirements result in a situation where passwords used on mobile devices are either easy for an attacker to break, or are too difficult for the user to remember and enter.

Many passphrase-based systems, which illustrate the trade-off required between ease of use and security, have been proposed for mobile devices. These include:
  PIN codes
    These are easy to remember sequence of numbers. However, the limited number of characters used (0 to 9)

makes them unsuitable as a source of cryptographic keys. Also, the need for repeated taps (e.g. on a touch screen) may leave marks which provide an indication of the digits used in a PIN.

Virtual keyboard based textual passwords

Whilst the number of characters which can be used to generate a password is increased, a user will tend to impose limits, e.g. by not mixing upper and lower case characters. In addition, character entry is slow and prone to errors.

Textual characters using character recognition

In such systems, a user enters a password by drawing a sequence of characters on a screen. As with virtual keyboards, users tend to limit the character set used, and character entry is slow and error prone.

Signature recognition and biometrics

Systems which make use of a handwritten signature tend to rely on a stored plaintext version of the signature to perform the required pattern recognition based comparison. This creates a vulnerability as an attacker may be able to observe the stored plaintext. Also, an attacker may obtain a copy of the signature elsewhere, e.g. from a signed cheque, and a user may be reluctant to change a long used signature as is required to maintain security. Biometric passphrases such as fingerprints and retina scans are difficult to implement in practice, and as with signatures do not lend themselves to changes.

Graphical passphrases

Graphical systems have been proposed where a user draws a "secret shape" on a touch sensitive screen. Whilst in theory such a system allows a user to select any combination of pixels available on the screen as his password, in practice users tend to draw passphrases consisting of a small number of continuous lines. By guessing or exhaustively searching all possible starting points, and examining all lines emanating from those start points, the search size becomes manageable for an attacker. Another graphical solution is to select a passphrase based upon tap points on a displayed graphical image. However, some of the tap points may be obvious, as distinctive features in the image will tend to be selected as passphrase components ahead of non-distinctive features. Both graphical systems also suffer from the disadvantage that repeatability of a tap may be difficult, unless the tap points are relatively large in area. However, large tap points will reduce the overall number of tap points available, reducing the entropy of the pass phrase.

Another graphical system relied upon the selection by a user of images from displayed sets of images. This system does not lend itself to mobile devices however, where data storage capacity is small, display resolution poor, and image processing capacity limited.

SUMMARY OF THE INVENTION

The present invention provides a solution to the password selection and use problems noted above. It stems from a number of observations.

Firstly, it can be observed that people find it difficult to memorise random strings of characters, but can easily memorise even long phrases that consist of meaningful words and concepts. The important component here seems to be the semantic content and how easy it is for the user to associate the password with something they have encountered earlier.

A second important observation is that recalling items within a named category is much easier than remembering an item by heart with no associated category. This is evidenced by how people seem to remember more easily multiple words, each from a different category, than a similar number of words from different categories. A simple way to illustrate this is to try to memorise 20 different city names, and then try to list them again in the same order. Many people can memorise most if not all of the cities, but they will usually have trouble listing them in the correct order. If the test is repeated with 20 names but each name is chosen from a different category, e.g. one city name, one country name, one animal name, etc., and the user is then asked to name "the city", then "the country", then "the animal", etc., the user will usually be able to list easily each item correctly. The category names support the user's memory retrieval process, which helps considerably in recalling the names. At the same time, these cues make it possible for the user to recall all the names in the correct order.

A third observation is that pen-driven PDAs and joystick controlled smart phones make it easy and fast to select an entry from an alphabetically ordered list, even if the list contains hundreds of entries. This is helped by the sharp resolution of modem displays and the accuracy of the touch screens. It is worthwhile to note that it is much faster to find an item from an ordered list than from an unordered list.

According to a first aspect of the present invention there is provided a method of generating or entering a password or passphrase or encryption key on a computer system, the method comprising:

storing a plurality of sets of values in a memory of the system, the values of each set defining respective elements which belong to a common domain, the domains of respective sets being distinct from one another;

selecting at least one value from each stored set or from each of a plurality of the stored sets; and combining the selected values or components thereof to form a password, passphrase, or encryption key.

A domain is defined by one or more characteristics. The values belonging to a given domain share or are mapped to the characteristic(s) of that domain. Human beings are capable of remembering a sequence of elements drawn from respective domains more easily than a sequence of randomly selected elements. It will be appreciated that the stored values are typically binary representations of the respective elements.

In an embodiment of the present invention, a user selects a value by selecting the corresponding element which may be displayed to him graphically. Preferably, the said step of enabling a user to select at least one value from each stored set comprises displaying on a display of the computer system a graphical user interface. In one embodiment, the interface comprises a graphically displayed slider, thumb wheel or the like, which can be operated by the user with a joystick, roller or another input device to scroll through the values of each domain in order to select a value for that domain. More preferably, for each position of the slider or wheel, the value corresponding to that position (or an element mapped to the value) is displayed to provide visual feedback to the user. More preferably, the display of the system is a touch sensitive display, and the graphical interface is operated by a pen, stylus, or the like. More preferably, after selection of a value for a given domain by the user, the value (or mapped element) is hidden from view.

In one embodiment of the invention, a set of sliders is displayed on a display of the system, one slider corresponding to each domain. The user selects a value from each domain in turn, using the corresponding slider.

Preferably, the values of each domain are arranged in a predefined order. In the case of text, the values may be arranged in alphabetical order. In the case of numbers, the values may be arranged in numerical order. In the case of dates, the values may be arranged in chronological order.

It will be appreciated that the values may be digital representations of an element. For example, the values may be ASCII representations of text. Alternatively, the memory may store a mapping between respective values and elements, where the elements are presented to the user for selection, and the values are used to generate the password. For example, values 00000001, 00000010, 00000011, etc, may be mapped to the countries Albania, Algeria, Andorra, etc.

Values belonging to domains may correspond or be mapped to graphical images. The images are displayed on the graphical user interface to allow a user to make a selection. A slider or similar component may be displayed to allow a user to scroll through the image values of a domain in order to make a selection.

Preferably, when employed to generate a password, the method allows the user to select which of the plurality of sets of values shall be used to generate the password, and the order of the selected sets. When the method is subsequently employed to enter a password, the user is presented with the ordered sets from which to make the value selections.

Where the method is employed to generate or enter a password or passphrase, an encryption key may be generated from the password or passphrase using a known mechanism, with the key being used to encrypt and decrypt data. For example, the selected values may be concatenated together to form a data string, the string compressed, and a hash function applied to the compressed string.

In certain embodiments of the invention, it is the computer system which selects values from value sets. This tends to improve the "quality" of a password as compared to a password selected by a user.

According to a second aspect of the present invention there is provided a computer system comprising:
 a memory storing a plurality of sets of values, the values of each set defining respective elements which belong to a common domain, the domains of respective sets being distinct from one another;
 a user interface; and
 processing means for selecting at least one value from each stored set or from each of a plurality of the stored sets, using the user interface, and for combining the selected values or elements thereof to form a password, passphrase, or encryption key.

The computer system may be, for example, a PDA, palmtop or laptop computer, mobile telephone or smart phone. However, the system may be a PC or workstation or other device.

According to a third aspect of the present invention there is provided a computer storage medium having stored thereon a computer program for causing a computer system to:
 store a plurality of sets of values in a memory of the system, the values of each set defining respective elements which belong to a common domain, the domains of respective sets being distinct from one another;
 select at least one value from each stored set or from each of a plurality of the stored sets; and
 concatenate the selected values or elements thereof to form a password, passphrase, or encryption key.

According to a fourth aspect of the present invention there is provided a method of securing data stored on a computer system, the method comprising:
 generating a password comprising a plurality of values;
 securing data stored on the system using said password;
 implementing a two level authorisation procedure, a first authorisation level requiring input into the system of only a subset of said plurality of values and a second level requiring input of the entire password.

In an embodiment of the present invention, each time said first authorisation level is implemented, it requires the input of a subset of values different from that subset required for the preceding implementation.

Preferably, the subset of values required for each implementation of the first authorisation level is selected from the complete set of values on a round robin basis.

Preferably, said step of generating a password comprises selecting a value from each of a plurality of value categories, each value category comprising a multiplicity of values.

Preferably, when said first authentication level is implemented, an icon grid is displayed for the value category corresponding to each value of the chosen subset of values, the user selecting a value from each icon grid. More preferably, each icon grid displays icons corresponding to a subset of the values contained in a value category.

Preferably, when said second authorisation level is implemented, a textual list of the values contained in a value category is displayed for each category, and the user selects a value from each list.

DETAILED DESCRIPTION OF CERTAIN EMBODIMENTS

Figure 1:
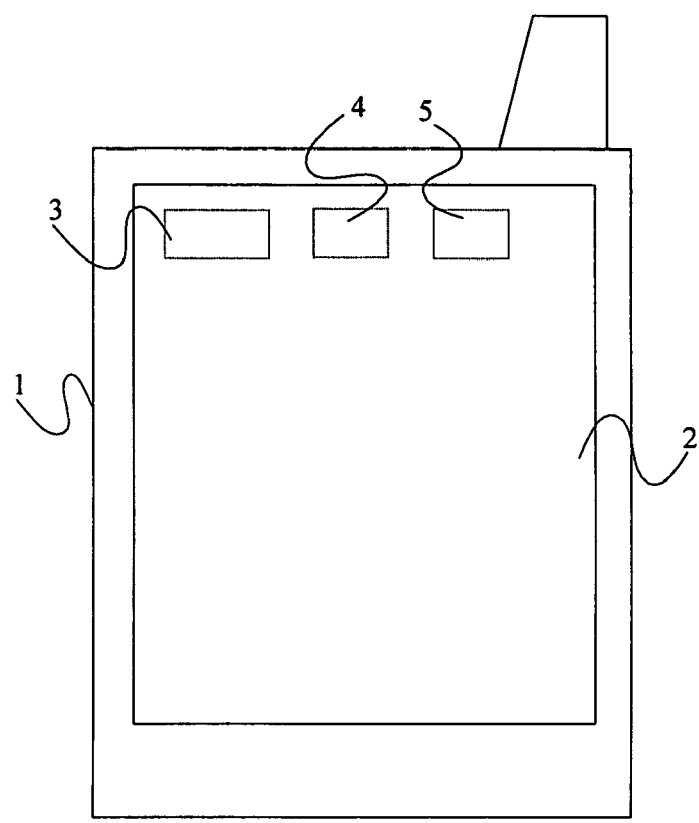
FIG. 1 illustrates schematically a mobile computer device.

There is illustrated in FIG. 1 a mobile computing device 1 which, in this example, is a Personal Digital Assistant (PDA). The PDA has a large display screen 2 which is touch sensitive to provide a mechanism for entering data into the device. The PDA 1 includes mobile (cellular) telephone functionality, e.g. GSM or third generation (e.g. 3G). The PDA 1 comprises a microprocessor 3, a ROM memory 4, and a RAM memory 5.

The RAM 5 is arranged to store both program files and user data. Stored in the RAM 5 (or possibly the ROM 4) is program code for encrypting data, typically user data files such as text files, images, contacts, spreadsheets, etc, and which is run by the microprocessor 3. The program may use an algorithm such as DES, Triple DES, AES or RSA, and makes use of a cryptographic key generated by applying a hash function and/or message authentication code algorithm to a passphrase supplied by a user of the device. The passphrase is first selected by the user when the encryption application is installed into the device (or when it is first activated if the encryption application is pre-installed into the PDA 1). The passphrase may subsequently be changed by the user. A mechanism for selecting the passphrase will now be described.

The "Discrete Element Password" scheme employs multiple types of value categories rather than the alphanumeric character set as the elements of the password. One discrete value is picked from each value category, and it is the combination of the values which provide the password (or passphrase). This scheme allows for the random generation of passwords that will be easy for the user to remember.

Figure 2:
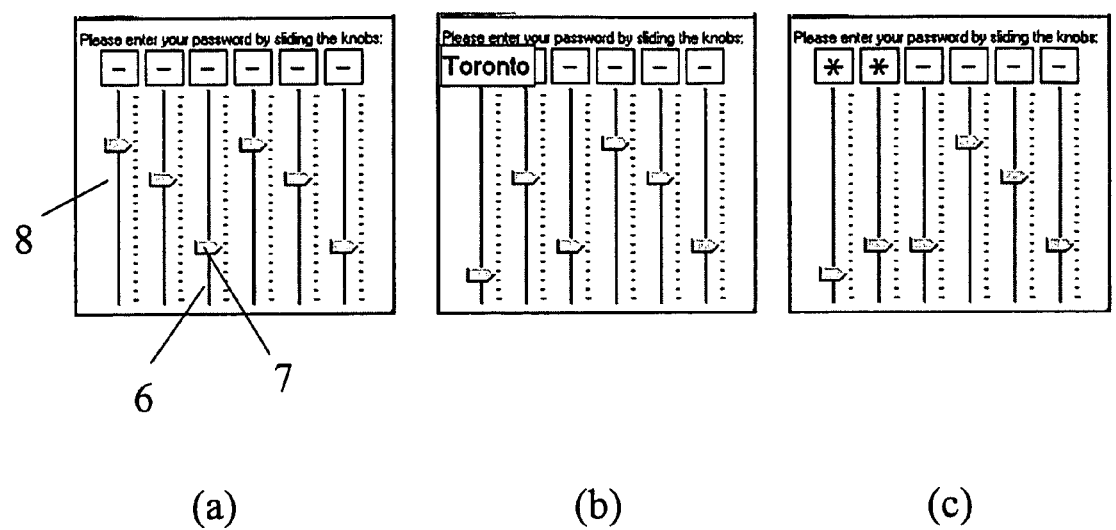
FIG. 2 illustrates a graphical user interface for presentation on the display of the device in FIG. 1.
Figure 3:
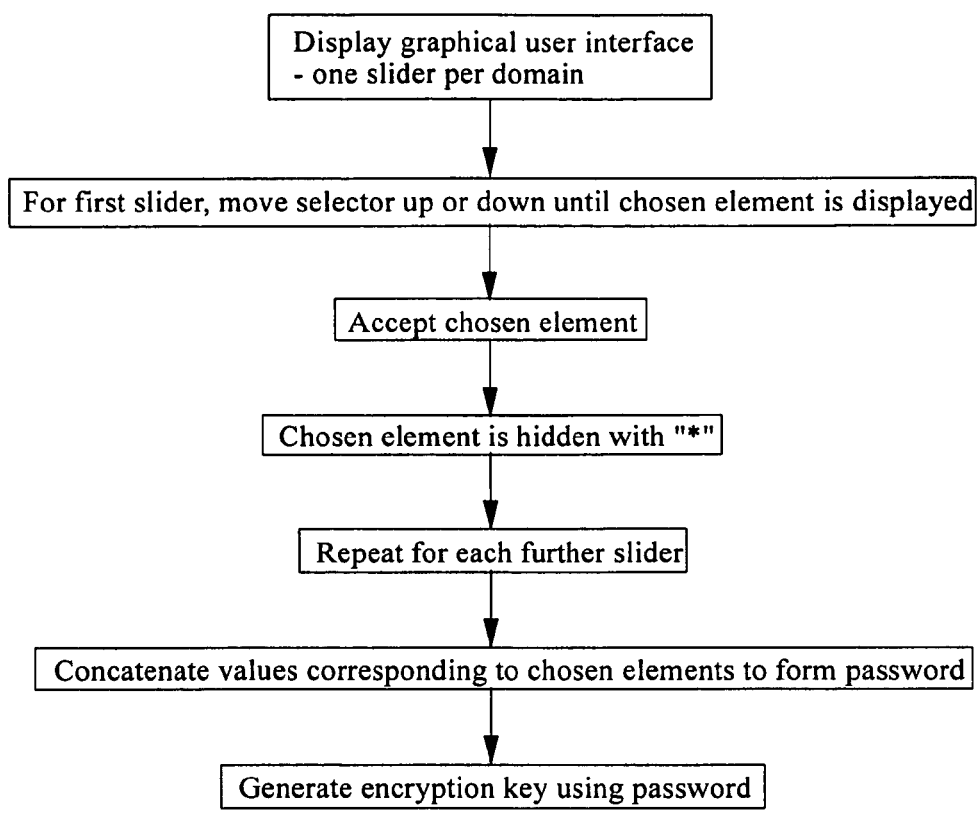
FIG. 3 is a flow diagram illustrating a method of selecting a password using the graphical user interface of FIG. 2.

The scheme can be implemented in several different ways. In the sample system presented below, the user is asked to select values one by one (or rather the element corresponding to a value, as the values are binary data mapped or representing user recognisable elements), each within a value category from respective value sets stored in the RAM 5, using a set of slider controls 6 as illustrated in FIG. 2a (which shows a screen "shot" taken from the display 2 of the PDA 1 of FIG. 1). The graphical user interface enables a user to move a selector 7 on each slider 6 with the pen or other pointer (not shown in the Figures). The final selector positions are combined into a number and processed, for example, with the PBKDF2 algorithm (RSA Laboratories. PKCS #5 v2.0: Password-Based Cryptography Standard. Version 2.0, March 1995) to create a cryptographic key that has a considerable amount of entropy. This process is further illustrated in the flow diagram of FIG. 3.

By way of example, each slider may allow a value to be selected from one of the following value categories:
Names of cities: Acapulco, Adelaide, Albany, Alexandria, Amsterdam, Anchorage, Ankara, Antwerp, Athens, Atlanta, Auckland, Austin, Baghdad, Bali, Baltimore, Bangkok, . . .
Names of countries: Albania, Algeria, Andorra, Angola, Argentina, Australia, Austria, Bahamas, Bangladesh, Barbados, Belgium, Bermuda, Bolivia, Botswana, Brazil, Bulgaria, . . .
Names of animal species: Aardvark, Alligator, Antelope, Ant, Ape, Armadillo, Baboon, Bandicoot, Bat, . . .
First names of people: Aaron, Abraham, Alice, Andy, Barbara, Benjamin, Beth, Bob, . . .
Historical events sorted by year: "1900—Quantum Theory invented by Max Planc", "1900—Zeppelin's first test flight", "1901—Marconi transmits first telegraph", "1901—First Nobel prizes awarded", "1901—US President McKinley assassinated", "1902—US gains control over Panama Canal", . . .
Other examples are:
last names of people
date of the year: "September 26"; 365 different values.
times of the day: "9:15", "14:30"; 12×60=720 different values, 24×60=1440 different values
colours, perhaps combined with other adjectives to have enough of distinct values: "yellow stripes", "green dots", "blue shape",
names of past presidents, historical figures, celebrities, or other people the user will recognize
names of foods
transitive verbs (verbs that require an object)
intransitive verbs
letters of the alphabet
letters of the alphabet in different colors (a-z in blue, a-z in red, a-z in green)
numbers 0-300
letters of the alphabet combined with numbers
percentages 0%-100%
certain kinds of pictures, e.g. a circle that grows in size and perhaps adds more detail towards the end of the scale. The different values must be distinctive enough so that the user will recognize the correct value.
dog breeds, cat breeds
names of Pokemon™ characters The user is constantly given visual feedback during the selection of values, by displaying the currently selected value for a value category in a small display window 8 at the top of the corresponding slider 6. Fine tuning is made easy by adjusting the value-change threshold by the pen speed: when the user moves the pen fast, the display jumps through the values, and when the user moves the pen slowly, the display scrolls through the values one by one. If a mistake is made, the user will notice this and can reselect the value.

FIGS. 2b and 2c illustrate two further screen shots during the password selection this series of screen shots. The interface initially shows the sliders at their default locations (FIG. 2a). The display windows 8 at the tops of the respective sliders contain a "-" to show that no values have been selected. The first value category is assumed to be cities, and the second screen of FIG. 2b shows the user moving the first slider to the "Toronto" position (which might alphabetically be between Tokyo and Tripoli). The selected name appears in the display window 8 during the selection process. After selecting this value for the first slider (e.g. by lifting the pen from the screen), the value in the display window 8 is replaced by an asterisk and, optionally, the knob of the slider hidden. The user then sets the value for the second slider, etc. The screen shot of FIG. 2c shows the interface after the second value category has been selected. It will be appreciated that at the start of each value selection procedure, a user may be prompted by displaying the name of the value category, e.g. "Cities".

The cryptographic strength of a Discrete Element Password is calculated as follows. Each slider has a resolution of R distinct values. If the value for a slider is set randomly, its entropy is $\log_2(R)$ bits. When the number of sliders $S>1$, the numbers produced by the sliders are concatenated to form the final cryptographic key. In binary format, these values can be represented by a concatenated binary number that has $S \times \log_2(R)$ bits.

Example 1: on a small-screen smart phone, it is practical to have 128 different values for each slider. Numbers 0 to 127 can be represented by 7-bit binary numbers 0000000 to 1111111. With 6 sliders, these numbers are combined to make a password with $6 \times \log_2(128)=42$ bits of entropy, assuming random selection of values within each category.
Example 2: on a PDA with 8 sliders of 256 different values, we get $8 \times \log_2(256)=64$ bits of entropy.
Example 3: on a web pad with 10 sliders of 512 different values, we get $10 \times \log_2(512)=90$ bits of entropy.

The Discrete Elements Password scheme thus achieves significantly better security than textual passwords.

Protection against onlookers (using a so-called "shoulder surfing" attack) can be further improved by implementing more categories than sliders, and only requiring the user to enter values for some of the categories during login. The cryptographic key is then constructed using the secret sharing method, resembling the scheme suggested in C. Ellison, C. Hall, R. Milbert, and B. Schneier. Protecting Secret Keys with Personal Entropy. Future Generation Computer Systems, v. 16, pp. 311-318, 2000. This way, a third party observing a single login session will not be able easily to impersonate the user. Security can be further improved by varying the order in which the sliders are displayed on the screen.

There are several issues to consider when selecting the value categories to use in a Discrete Element Password system. Firstly, different kinds of value categories may have a different number of member values and will thus produce a different number of bits. This will affect the combined password length. Secondly, a value category should be sortable to enable the user to find the correct value fast. The obvious sort orders include alphabetical, numeric and chronological, but criteria such as size or weight would be viable for some types of value categories.

Thirdly, it is known that people remember concepts and words by association with things that are already familiar to them. If a user cannot recognise a name as a member of a given value category, it's much more difficult to remember. Here are a couple of examples:

- The names of Pokemon™ characters would make good value category for some users, but it wouldn't work well for a user that's not familiar with Pokemons and their names.
- An American user would probably find a value category that consists of US capitals and large cities easy, but find a similar value category that consists of hundreds of Japanese city names difficult. The opposite would be true for a Japanese user.
- A dog lover would easily be able to picture the values of a category that consists of dog breed names. The user would be able to remember a particular dog breed name much more easily than someone who does not know what the different dog breeds look like.
- Certain kinds of value categories will require localisation in order to be usable by foreign users. If the user does not know the meaning of a word, memorizing it will be much more difficult.

Users should therefore be familiar with each value category and recognise the values within the category easily. Preferably, the user should be able to easily connect an individual value to its category, and to easily name tens of examples of members of the category on request. That is to say that a user should be able easily to master both the "is-a" and "has-a" relationships between the value category and its members.

To overcome these issues, it is suggested that the number of supported value categories (available in a given device) should be larger than the number of discrete values required to complete a password. The user should be allowed to choose which value categories the system should use, and in which order they are presented. The binary password generated by the system will in any case be independent of the choice of value categories.

It should be noted that the Discrete Element Password scheme works well with words of any length as members of the value categories, and the same is true of the human brain. This means that there is no particular reason to try to find as short words as possible to put in the value categories. It should also be noted that the Discrete Element Password scheme is based on point-and-select rather than textual input, which is the case with most other systems that provide sufficient entropy to ensure security.

There now follows a list of modifications or additions which may be made to the DEP scheme described above.

- Instead of typing each element of the password on a keyboard, choose it from a preconfigured list using a control such as a joystick, a roller, a pen, a touch screen, or left/right/select buttons. The mechanism is therefore also applicable to systems that do not have a pen input device but rather, for example, a small set of buttons such as left, right, and select. These three buttons alone would in fact be sufficient to control the value selection.
- The system generates the password, instead of allowing the user to choose it. In order to teach the user the password, the device may show the first element of the password on the screen, animate the slider going to the right value, and then ask the user to repeat the process by entering that value. The process is only advanced to the next element when the user got the previous one right. After the last element has been correctly entered, the user is asked to enter the whole password once more.
- By choosing the right kinds value categories, passwords can be constructed which make a meaningful sentence. For example; "Violet cat from Paris eats yellow plant in Toronto" "Alice Smith shakes sushi in Moscow on September 26"
- The use of prepositions at fixed positions would ease making a complete sentence and thus make it more memorable.
- The user may be allowed to choose the preferred sentence structure, and change the choice of value categories to fit that structure.
- The user is allowed to modify existing value categories and create new value categories, e.g. names of relatives, friends, celebrities, special years and dates. Other personally important and memorable value categories may be defined.
- To avoid a "shoulder surfing" attack, on each slider, put the first value in that value category not at the top of the list but at a random position. The list will still contain all the same values and the values will be in sorted order in relation with their neighbors, but the list will restart in the middle, and wrap from end to beginning. Initially, the knobs are shown at the "origin" position, i.e. the first key value is reached by moving the knob one step down, and the slider "wraps" at the bottom so the value N at the bottom is followed by value N+1 at the top.
- The last key value is reached one step up from the origin position. This will not affect the password, as the return values from each slider will in any case be identical to the non-randomized case.
- If the screen size doesn't allow for the sliders to be of sufficient length to choose the value among a value category with lots of members, make the slider control work so that more values will "scroll" into view when the user approaches the upper or lower limit set by the size of the slider. This approach could take advantage of the standard "list box" user interface elements available on current smart phone and PDA platforms. One suggested user interface design for this is a scrolling wheel viewed from the edge, the user turning the wheel to find the correct value. In one extreme example, the slider displays just one value, and the user sets the value by scrolling through them.
- If the screen size doesn't allow for a large enough number of sliders, the screen can "scroll" to allow all of the sliders to be viewed. In one extreme, one single slider or list box can be re-used several times to let the user choose the correct values for multiple value categories.
- A value may be chosen from a multi-dimensional array rather than a one-dimensional slider. For example, names are placed in a matrix. The names are sorted into rows by first letter:
  A Aaron, Abraham, Alice, Andy, . . .
  B Barbara, Benjamin, Beth, Bob, . . .
  C Carmelia, Ceasar, Cecil, Cecilia, . . .
- The names are not shown on screen, but each one is represented by one pixel in a row. When the pen moves vertically on the screen, the first letter of the name shown on top changes with each row. The names starting with the same letter can be found on the same horizontal row. When the first name has been entered, change to a different value category. If there are enough of pixels on the screen, perhaps just three names are needed to complete a password that is sufficiently long. With 1024×768 pixels, each pixel has more than 19 bits of entropy (1024×768=3*2$^{18}$=2$^{19}$+2$^{18}$) so three words would result in almost 60 bits.

In a variation to this mechanism, a world map may be used as the background image from which a city is chosen. The steps are: show the name of the city currently selected; if an area is selected that doesn't match a city location, describe the position in relation to the nearest two cities: "30 km north of Helsinki, 10 km west of Hyvinkää". Any pixel can be selected, as the system doesn't need to be limited to existing cities.

In another variation, a city map is used, i.e. display the address currently selected in a familiar way: "1103 East Hudson Street". Alternatively, a city map with elevation information may be displayed, e.g. "1103 East Hudson Street, 15$^{th}$ floor."

In yet another variation, value categories are displayed in turn, with each value of a value category being displayed on the screen. Values may be represented by an appropriate graphical icon and if appropriate a value name displayed beside the icon. It will be appreciated that human recollection of graphical icons is generally better than that of names.

The chosen long password may be used in combination with a shorter password in a two level security system. The long password is used as the cryptographic key. During the day, it is sufficient to ask for the simple shorter password at regular intervals or after a predetermined idle time, e.g. when a screensaver is activated. The shorter password is only used for authentication and may be a truncated version of the long password, for example three of the values of the long password, picked randomly or through a method such as round robin. The system keeps the long password in memory so that the encryption/decryption process can work continuously. If the user makes a mistake entering the shorter password, the long password is requested.

In order to further illustrate the invention, an alternative, graphical, implementation will now be described.

The traditional wisdom in designing user authentication systems is that the user's password is always the weakest link. Users very often choose bad passwords that are easy to guess, too short, or written down where others may discover it. The Discrete Element Password scheme described here addresses these issues by implementing a user authentication system where the password is generated by the system rather than chosen by the user, is long enough to protect against even the most advanced attacks, and is difficult to capture by observing the user enter it. The password is also easy to memorize so that the user will have no reason to write it down.

This Discrete Element Password scheme is designed to be easier, faster and more secure than conventional alphanumeric passwords or numeric PIN codes typically used on smartphones. The authentication is two-level: a full password is required when the device is restarted, but only a short portion of the password is required during the normal first-level authentication which takes place much more often than the second-level authentication. The first-level authentication is used for example when the screen has been locked because of a screensaver turning on, i.e. after an idle time limit has triggered.

The first-level authentication is implemented using a menu of graphical icons representing values (selected from respective value categories) and the second level with a scrolling list of words (again representing values) that constitute the full password. The first-level authentication uses a different part of the full password each time and repeats when all parts of the passwords have been shown. The user will effectively be reminded of the full password but will not be required to enter all of it every time. This enables the user to recall the full password in its entirety when necessary through the second-level authentication system. This system provides a significant improvement over other two-level authentication schemes in which the short password is different from the full password and both must be remembered separately.

The first level authentication cycles through the value categories using a round robin method which ensures that the same categories are never asked twice in a row. This prevents shoulder surfing attacks to which traditional systems (that use the same password every time, such as a numeric PIN) are vulnerable.

The design goals of the scheme include:
Fast and easy password entry on devices that lack a physical keyboard.
Meaningful and memorable passwords, even if they are randomly generated.
Ability to use randomly generated passwords in addition to user-chosen ones to bring immunity against dictionary attacks.
Sufficient amount of entropy in the password to guard against brute force attacks, in the order of 40 to 64 bits of practical cryptographic strength.
Protection of password from onlooking persons. The user can enter the password through the numeric keypad in such a way that it is not revealed to someone who has a view of the screen.

When the user starts the application and the relevant (.INI) file does not contain a password, an initiation dialog box is shown. This indicates that the security application will help keep data private by locking the device when it is not in use. This involves the automatic generation of a password by the device. The password will consist of five values chosen from respective value categories. The user is informed that a screen for each value category will now be displayed, each screen containing a set of icons depicting the values for a given value category, with the icon depicting the password value being highlighted. Beneath each icon is a word corresponding to the icon. The series of highlighted icons/words must be memorised by the user.

By way of example, a value category is defined corresponding to female first names. Perhaps 128 such names are defined and stored in the device's memory. The memory also stores 9 icons representing different female faces. The icons need to be sufficiently different from each other so that the user will be able to recognize the familiar icon fast, without always having to read all the names. Each icon must be equally usable with any of the values (names) in the value category. Here are the suggested icon types for other value categories:
Male first name—icons that depict male faces of different types
Last name—icons that depict generic coats of arms or family shields
City—icons that depict generic buildings and city views
Date—icons that picture calendars, organizers, etc.

Numbers that correspond to the password values are generated randomly and saved to memory (but not yet to the .INI file). The corresponding words from each list are then located, and an icon is assigned to the selected word in each category using modulo arithmetic from among the nine icons available in each category. For example, if the numeric value for the element in a category is 8, then icon number 8 is used. That same icon is also used if the numeric value is 17 (=9+8) or 26

(=2×9+8). This means that it will appear that each element has its own unique icon, as it will always display using the same icon, although there are not more than nine different icons per category.

Figure 4:
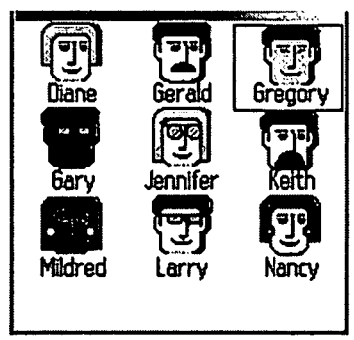
FIG. 4 illustrates a graphical user interface for presentation on the display of the device in FIG. 1.

Another eight words from each list are randomly chosen as decoys. Their icons are assigned randomly from the among remaining icons so that no icon is used twice. The icons are located in the icon grid view sorted by the words attached to them so the grid will be alphabetically ordered. This layout is saved in the .INI file so that the icon grid view for a category will always look the same for the same user. On another device where the password is different, the grid layout will be different. This makes it easy for the user to notice if she unintentionally takes another user's device and tries to use her password there. It is likely that the words her password consists of will not appear in the icon grid view on the "foreign" device, and that the icons will be at different locations. The screen for the first value category is illustrated in FIG. 4, with the name "Gregory" selected as the first password value. This screen is displayed for three seconds, and then the screen is blanked for half a second before showing the icon grid view for the next value category.

When the user has seen the five password screens, she is given the choice of accepting the password or having another password generated for her. Assuming that the password is accepted, the five screens are again displayed in sequence, but this time the correct value is not highlighted. The user must enter the password she has just seen by choosing the correct icon from each category through the icon grid view. After all of the values have been entered by the user, the device checks if a mistake has been made.

Figure 5:
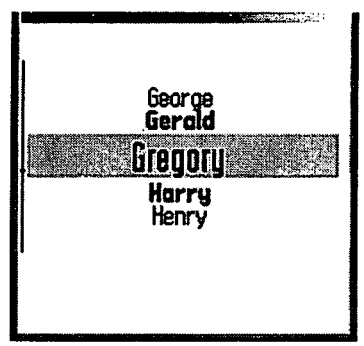
FIG. 5 illustrates a graphical user interface for presentation on the display of the device in FIG. 1.

When the user has entered the password correctly using the icon grid view, a dialog box is displayed noting that the password will now be displayed again through a secondary level of textual lists (again, five lists are displayed, one for each value category). Each element of the password is displayed by automatically scrolling to the correct entry in an element list view. The display is "frozen" for three seconds, and then the screen is blanked for half a second before going to the next element category. A textual list is illustrated in FIG. 5.

After showing the element values for all five categories, the user is asked to enter the password again using the textual lists. She is also informed that when the device is in normal use, it will only be necessary to perform this procedure if a mistake is made while choosing an icon (nb. Selection from the textual list is more laborious than selection from an icon grid, as a textual list might contain 128 values whilst the icon grid contains only a subset of 9 of these 128 values). When the user has entered the password correctly, the password is saved in the .INI file in numeric obfuscated format. The user is then informed that the device is protected and will be locked automatically when it is not in use. Of course, various mechanisms may be employed to make selection from a list easier. For example, a currently selected word in a list may be highlighted or enlarged, the selected word changing as the user scrolls through the list.

Once the security mechanism has been activated and a password chosen, the user will have to enter the full password correctly, using the textual lists, when the device is next turned on. Assuming that this is done correctly, the device can be used, until such time as a screensaver is activated. The user may set the time period for which the device must be inactive before the screensaver is turned on. Following activation of the screensaver, when the user attempts to use the device, she will be asked to enter a shortened version of the password. The values making up the shortened version are selected by the device from the five values making up the full password. Each time a shortened password is required, the device selects a different two of the five values, e.g. on a round robin basis. The user is presented with the relevant two value category screens, each of which contains one of the selected values. A selection may be made by pressing a number (on a keypad) corresponding to an icon, by touching an icon when the display is touch sensitive, or by any other suitable method. The selected value may or may not be highlighted. Assuming that the user selects correctly, the device is activated. If the user selects incorrectly, she is then requested to enter the complete password using the five textual list screens. This approach helps to foil shoulder surfing attacks, as it is unlikely that an observer will be able to use an observed password to access the device. The level of security afforded by the first authorisation level can be increased or decreased by changing the number of values making up the shortened password and/or by varying the period of inactivity required to activate the screensaver.

A further significant advantage of the two level procedure described here is that each time the first level authentication stage is performed, the user is reminded of a part of the full password. Assuming that the first level procedure is performed on a fairly regular basis, the user will be reminded of the full password for use in the second level authorisation procedure, should it become necessary.

In some cases, a user may wish to synchronise data on a device with a PC or the like. If the device is locked, then the PC must provide the password to the device. This obviously presents difficulties as the PC may not have the security software installed on it and cannot therefore provide the graphical or textual list screens to the user. The device may accept from the PC a textual representation of the password, which can be provided to the PC by the user. Thus for example if the password consists of the elements "Jill", "Bob", "Smith", "Toronto" and "June 14", the textual equivalent could be the string "jill bob smith toronto june 14" or perhaps a string that contains just the first letter of each word: "jbstj14".

The invention claimed is:

1. A method of securing data stored on a computer system, the method comprising:
   generating a password comprising a plurality of values;
   securing data stored on the system using said password;
   implementing a two level authorisation procedure to enable user access to said secured data, a first authorisation level requiring user input into the system of only a subset of values selected from said plurality of values and a second level requiring user input of the entire password; and
   wherein if a mistaken entry is made in the first level authorisation, a second level authorisation is implemented, and
   wherein each time said first level authorisation is implemented, the input of a subset of values reselected from said plurality of values that differs from that subset selected for the preceding implementation is required.

2. A method according to claim 1, wherein the subset of values required for each implementation of the first authorisation level is selected from the complete set of values on a round robin basis.

3. A method according to claim 1, wherein said step of generating a password comprises selecting a value from each of a plurality of value categories, each value category comprising a multiplicity of values.

4. A method according to claim 3, wherein, when said first authentication level is implemented, an icon grid is displayed for the value category corresponding to each value of the chosen subset of values, the user selecting a value from each icon grid.

5. A method according to claim 4, wherein each icon grid displays icons corresponding to a subset of the values contained in a value category.

6. A method according to claim 3, wherein, when said second authorisation level is implemented, a textual list of the values contained in a value category is displayed for each category, and the user selects a value from each list.

7. A computer system comprising:
first processing means for generating a password comprising a plurality of values and for securing data stored on the system using said password; and
second processing means implementing a two level authorisation procedure to enable user access to said secured data, a first authorisation level requiring user input into the system of only a subset of values selected from said plurality of values and a second level requiring user input of the entire password,
wherein if a mistaken entry is made in the first level authorisation, a second level authorisation is implemented, and
wherein each time said first level authorisation is implemented it requires the input of a subset of values reselected from said plurality of values that differs from that subset selected for the preceding implementation.

8. A computer storage medium having stored thereon a computer program for causing a computer system to:
generate a password comprising a plurality of values;
secure data stored on the system using said password; and
implement a two level authorisation procedure to enable user access to said secured data, a first authorisation level requiring user input into the system of only a subset of values selected from said plurality of values and a second level requiring user input of the entire password,
wherein if a mistaken entry is made in the first level authorisation, a second level authorisation is implemented, and
wherein each time said first level authorisation is implemented, the input of a subset of values reselected from said plurality of values that differs from that subset selected for the preceding implementation is requried.

* * * * *